(12) United States Patent
Chang et al.

(10) Patent No.: US 11,669,412 B2
(45) Date of Patent: Jun. 6, 2023

(54) METHOD, ELECTRONIC DEVICE AND COMPUTER PROGRAM PRODUCT FOR STORAGE MANAGEMENT

(71) Applicant: EMC IP Holding Company LLC, Hopkinton, MA (US)

(72) Inventors: Shaofeng Chang, Shanghai (CN); Xiaoliang Zhu, Shanghai (CN); Jing Yu, Shanghai (CN); Ming Zhang, Shanghai (CN); Xiaolei Hu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/411,257

(22) Filed: Aug. 25, 2021

(65) Prior Publication Data
US 2022/0327032 A1    Oct. 13, 2022

(30) Foreign Application Priority Data

Apr. 9, 2021   (CN) .......................... 202110387812.6

(51) Int. Cl.
*G06F 11/14*    (2006.01)
(52) U.S. Cl.
CPC ...... *G06F 11/1469* (2013.01); *G06F 11/1451* (2013.01); *G06F 2201/84* (2013.01)

(58) Field of Classification Search
CPC ............. G06F 11/1469; G06F 11/1451; G06F 2201/84
See application file for complete search history.

(56) References Cited

U.S. PATENT DOCUMENTS

| | | | |
|---|---|---|---|
| 8,260,750 B1* | 9/2012 | Gugick ............... | G06F 11/1461 707/645 |
| 9,720,783 B1* | 8/2017 | Kulkarni ............. | G06F 11/1461 |
| 11,429,436 B2* | 8/2022 | Zhu ..................... | G06F 11/3452 |
| 2012/0089572 A1* | 4/2012 | Raichstein .......... | G06F 11/1461 707/645 |
| 2018/0067813 A1* | 3/2018 | Venkatesh ........... | G06F 11/1469 |
| 2021/0336968 A1* | 10/2021 | Bender ................ | H04L 63/145 |
| 2022/0043715 A1* | 2/2022 | Liao .................... | G06F 11/1484 |
| 2022/0274106 A1* | 9/2022 | Yin ........................ | C23C 16/56 |

* cited by examiner

*Primary Examiner* — Alford W Kindred
*Assistant Examiner* — Tiffany Thuy Bui
(74) *Attorney, Agent, or Firm* — Chamberlain, Hrdlicka, White, Williams & Aughtry

(57) ABSTRACT

A method, electronic device, and computer-readable medium for storage management is disclosed. The method for storage management includes acquiring a data change rate of a data source, the data change rate indicating an occurrence rate of data to be backed up in the data source. The method also includes acquiring a recovery capability of a backup system to recover backed-up data and determining, based on the data change rate and the recovery capability, a backup strategy for backing up the data to be backed up.

12 Claims, 6 Drawing Sheets

METHOD, ELECTRONIC DEVICE AND COMPUTER PROGRAM PRODUCT FOR STORAGE MANAGEMENT

CROSS REFERENCE TO RELATED APPLICATIONS

This application claims priority under 35 U.S.C. § 119 to Chinese Patent Application No. 202110387812.6, filed on Apr. 9, 2021. The contents of Chinese Patent Application No. 202110387812.6 are incorporated by reference in its entirety.

TECHNICAL FIELD

Embodiments of the present disclosure relate generally to storage management, and in particular, to a method, an electronic device, and a computer program product for storage management.

BACKGROUND

A backup strategy is created to automatically perform backup operations using a backup system. A backup strategy can specify a storage location of backup data and the frequency of performing backup operations. In addition, a backup type can be specified in the backup strategy. There are different backup types, for example, full backups and non-full backups (such as differential backups and incremental backups). Different backup types have different advantages and disadvantages. From the perspective of producers of backup data, a full backup requires longer backup time and larger backup space, while a non-full backup requires shorter backup time and less backup space. From the perspective of users of backup data, a full backup has a shorter recovery time objective (RTO) compared with a non-full backup. However, backup strategies created by conventional storage management methods are inefficient.

SUMMARY OF THE INVENTION

Embodiments of the present disclosure provide a method, an electronic device, and a computer program product for storage management.

In one aspect of the present disclosure, a method for storage management is provided. The method includes: acquiring a data change rate of a data source, the data change rate indicating an occurrence rate of data to be backed up in the data source; acquiring a recovery capability of a backup system to recover backed-up data; and determining, based on the data change rate and the recovery capability, a backup strategy for backing up the data to be backed up.

In another aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to perform actions including: acquiring a data change rate of a data source, the data change rate indicating an occurrence rate of data to be backed up in the data source; acquiring a recovery capability of a backup system to recover backed-up data; and determining, based on the data change rate and the recovery capability, a backup strategy for backing up the data to be backed up.

In another aspect of the present disclosure, a computer program product is provided. The computer program product is tangibly stored on a non-transitory computer-readable medium and includes machine-executable instructions, wherein the machine-executable instructions, when executed, cause a machine to implement any step of the method described according to the first aspect of the present disclosure.

The Summary of the Invention is provided to introduce the selection of concepts in a simplified form, which will be further described in the Detailed Description below. The Summary of the Invention is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

In the accompanying drawings, the same or corresponding numerals represent the same or corresponding parts.

DETAILED DESCRIPTION

Preferred embodiments of the present disclosure will be described in more detail below with reference to the accompanying drawings. While the preferred embodiments of the present disclosure are shown in the accompanying drawings, it should be understood that the present disclosure can be implemented in various forms without being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" denotes "at least one additional embodiment." The terms "first," "second," and the like may refer to different or identical objects. Other explicit and implicit definitions may also be included below.

As described above, a backup strategy is created to automatically perform backup operations using a backup system. A comprehensive backup strategy needs to be defined to meet recovery requirements under specific storage space constraints. Multiple backup types should be configured using independent scheduling schemes in the backup strategy. Typically, a scheduling scheme is configured with a predetermined repetition period, such as hourly, daily, or weekly. The backup strategy may include a combination of scheduling schemes, such as full backups on a daily basis and incremental backups on an hourly basis. Since most backups are incremental backups that occupy small storage space, such backup strategy can meet the storage space requirements. In addition, the backup strategy further needs to take into account the time taken to recover the backup data. Some data sources may possibly be off-line for several days without serious consequences. However, some data sources, such as servers with high priority, can only be down for a few seconds. Otherwise, it will cause dissatisfaction of users and have a negative impact on business. In this case, it is difficult for backup administrators to determine appropriate scheduling schemes (e.g., frequency or interval) for various backup types, making it difficult to create an appropriate backup strategy to meet the recovery time objectives of key business data sources.

Specifically, in a production environment, there are a large number of protected data sources with backup demands. These data sources have different data change rates and recovery time objective requirements. Conventionally, however, only a fixed backup strategy is simply used to back up different data sources.

Figure 1A:
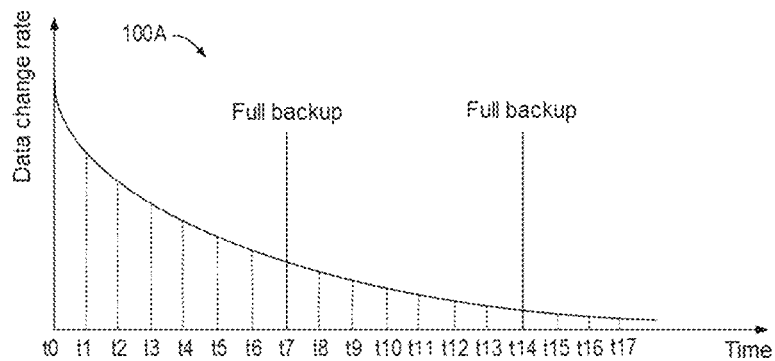
FIGS. 1A-1C illustrate fixed backup strategies at different data change rates according to some embodiments of the present disclosure.
Figure 1B:
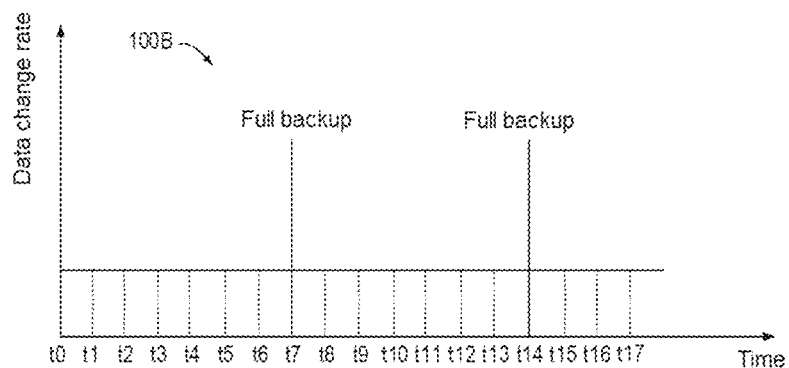
Figure 1C:
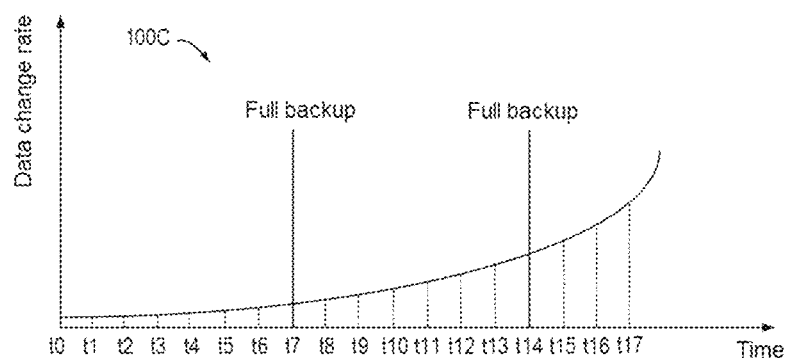

FIGS. 1A-1C illustrate fixed backup strategies 100A-100C at different data change rates according to some embodiments of the present disclosure. As shown in FIG. 1A, during time period t0-t17, the data change rate of data source 1 gradually decreases. As described in FIG. 1B, the data change rate of data source 2 is relatively stable. In addition, as shown in FIG. 1C, the data change rate of data source 3 gradually increases. However, for these data sources with different data change rates, full backups are triggered periodically at a fixed frequency or intervals at time t0, t7, and t14, and incremental backups are also triggered periodically at a fixed frequency or intervals at the remaining time.

Comparing the data changes in two intervals t0-t7 and t7-t14, it can be found that the data of data source 1 decreases, while the data of data 3 increases. In this case, the time taken to perform incremental backups and the time taken to recover the incremented backups will also vary. The reason is that in order to recover one incremental backup, the most recent full backup and the intermediate incremental backups between that full backup and that incremental backup need to be recovered in order. It can be seen that a series of backups need to be recovered to ensure that the backup data is recovered. The later the incremental backup (e.g., incremental backups at time t6 and t13), the more the time it takes to recover.

For data source 1, since the incremental backups at time t1-t5 are relatively large, it takes a longer time to recover these incremental backups. This will cause the recovery of the incremental backup at time t6 to possibly fail to meet the recovery time objective. In other words, the time required to recover the incremental backup at time t6 may exceed the recovery time objective.

For data source 3, since the incremental backups at time t1-t6 are small, from the perspective of meeting the recovery time objective and saving storage space, more incremental backups should be performed before time t7 when the full backup is performed.

For data source 2, the backup strategy should be determined according to its data change rate, instead of manually determining a fixed backup strategy. Conventionally, however, the backup strategy depends entirely on the experience or guesswork of a backup administrator. In a dynamically changing backup environment, this manually determined fixed backup strategy is difficult to meet various service level requirements such as recovery time objective and storage space saving.

It can be seen that a fixed backup strategy should not simply be used to back up data to be backed up of different data sources.

According to an example embodiment of the present disclosure, an improved solution for storage management is proposed. In this solution, a data change rate of a data source can be acquired. The data change rate indicates an occurrence rate of data to be backed up in the data source. In addition, a recovery capability of a backup system to recover backed-up data can be acquired. As a result, a backup strategy for backing up the data to be backed up can be determined based on the data change rate and the recovery capability.

In this manner, this solution can dynamically and intelligently determine the backup strategy in consideration of the data change rate of the data source and the recovery capability of the backup system, thus improving the backup efficiency of the backup system and improving user experience. The embodiments of the present disclosure will be specifically described below with reference to the accompanying drawings.

Figure 2:
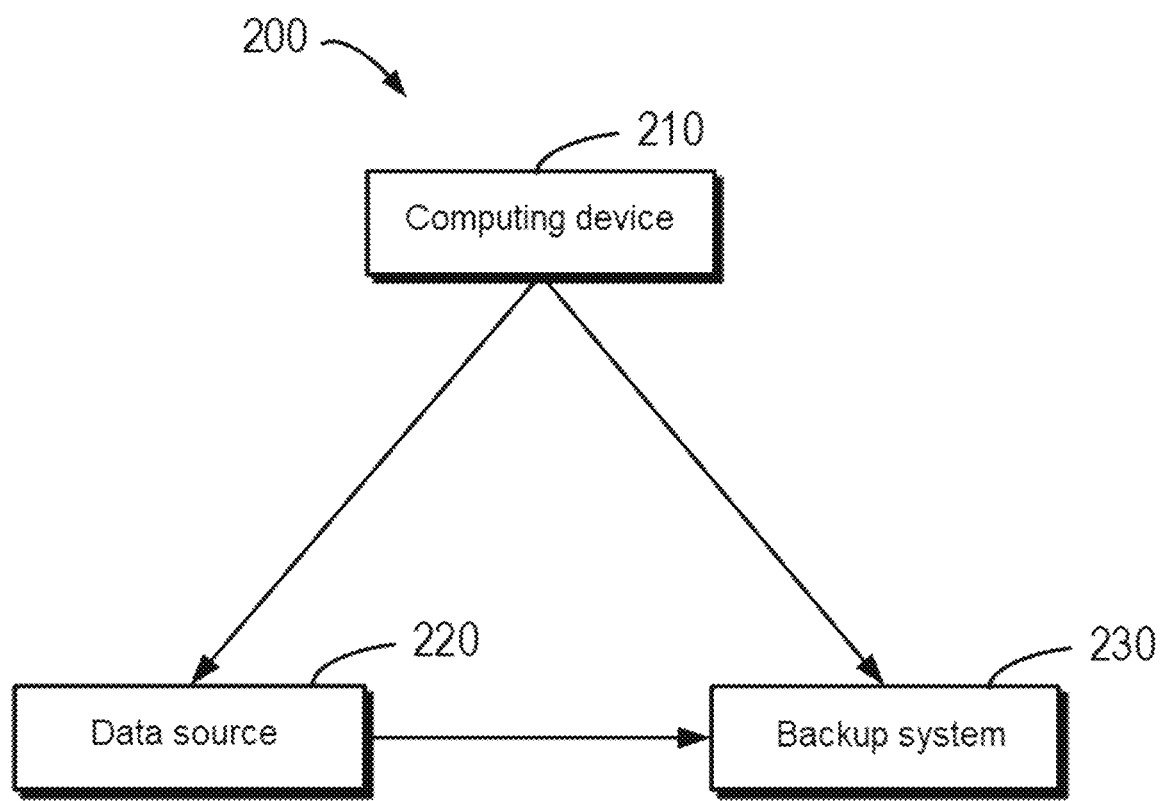
FIG. 2 illustrates a schematic diagram of an example of a storage management environment in which some embodiments of the present disclosure can be implemented.

FIG. 2 illustrates a schematic diagram of an example of storage management environment 200 in which some embodiments of the present disclosure can be implemented. Storage management environment 200 includes computing device 210, data source 220, and backup system 230. As an example, computing device 210 can be any device with a computing capability. For example, computing device 210 can be a personal computer, a tablet computer, a wearable device, a cloud server, a mainframe, a distributed computing system, etc. Data source 220 can be any source from which the data to be backed up comes, for example, a bank information system, a school archive system, a database of an information technology company, etc. Backup system 230 can be any system with backup capability, for example, a backup database, a distributed storage system, a cloud, etc.

Figure 3A:
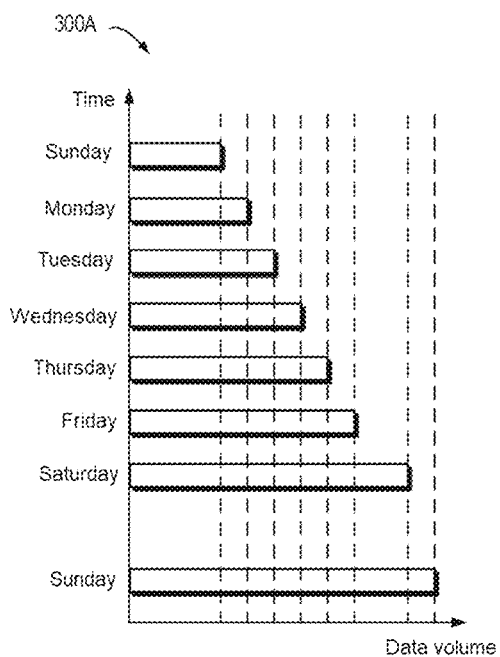
FIGS. 3A-3C illustrate schematic diagrams of examples of full backups, differential backups, and incremental backups according to some embodiments of the present disclosure.
Figure 3B:
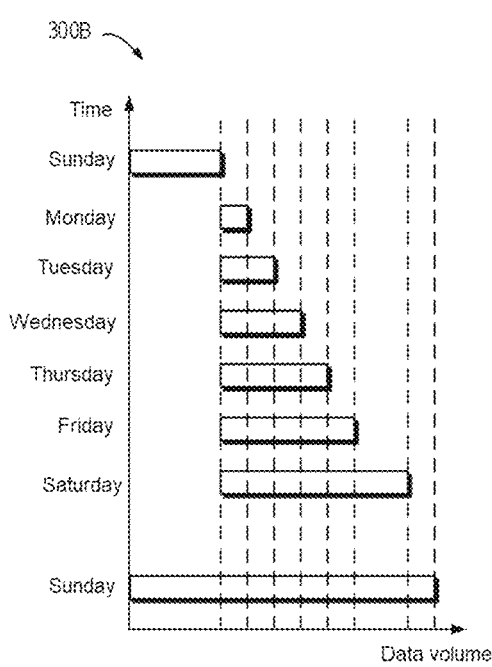
Figure 3C:
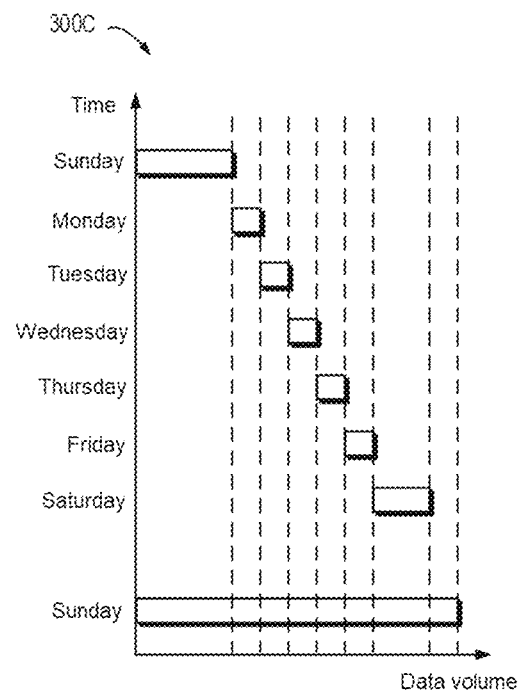

The data to be backed up that comes from data source 220 can be backed up to backup system 230. Different types of backups can be performed on the data to be backed up, for example, full backups, differential backups, and incremental backups. Differential backups and incremental backups are sometimes interchangeably referred to collectively as non-full backups. FIGS. 3A-3C illustrate schematic diagrams of examples of full backups 300A, differential backups 300B, and incremental backups 300C according to some embodiments of the present disclosure.

As shown in FIG. 3A, in a full backup, the entire data to be backed up is backed up each time. As shown in FIG. 3B, in a backup cycle of a differential backup, the entire data to be backed up is backed up only in the first backup, and in subsequent backups, only the part that is different from the data to be backed up in the first backup is backed up. As shown in FIG. 3C, in a backup cycle of an incremental backup, the entire data to be backed up is backed up only in the first backup, and in subsequent backups, only the part that is different from the data to be backed up in a previous backup is backed up.

The backup operations can be performed according to a backup strategy. Computing device 210 can perform a storage management operation to determine the backup strategy for backing up the data to be backed up. Hereinafter, the storage management operation performed by computing device 210 will be described in detail with reference to FIG. 4.

Figure 4:
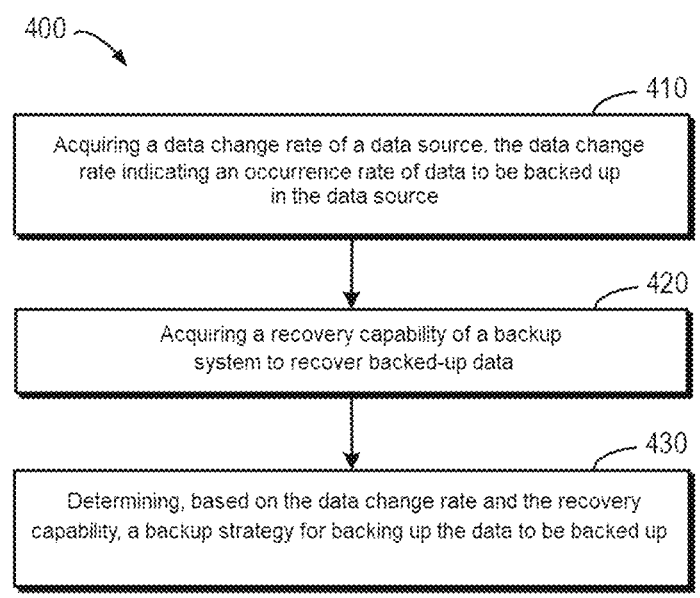
FIG. 4 illustrates a flow chart of an example of a method for storage management according to some embodiments of the present disclosure.

FIG. 4 illustrates a flow chart of method 400 for storage management according to some embodiments of the present disclosure. Method 400 can be implemented by computing device 210 as shown in FIG. 2. Alternatively, method 400 can also be implemented by a subject other than computing device 210. It should be understood that method 400 may also include additional steps not shown and/or may omit the steps shown, and the scope of the present disclosure is not limited in this respect.

At 410, computing device 210 acquires a data change rate of data source 220. The data change rate indicates an occurrence rate of data to be backed up in data source 220.

The data change rate can be acquired in various manners. In some embodiments, it is feasible to acquire from a backup administrator the data change rate provided by the backup administrator based on his or her experience. Alternatively, the data change rate can be predicted based on a historical data change rate. To this end, in some embodiments, computing device 210 can acquire the historical data change rate of data source 220. The historical data change rate can indicate the occurrence rate of historical backup data in data source 220. Thus, computing device 210 can determine the data change rate based on the historical data change rate.

The historical data change rate can be acquired in various manners. In some embodiments, computing device 210 can acquire the historical data change rate directly from backup system 230.

Alternatively, one backup operation in backup system 230 can be referred to as a job. This job may include the size of the historical backup data and the time for backing up the historical backup data. As a result, computing device 210 can acquire the size of the historical backup data and the time for backing up the historical backup data. Then, computing device 210 can determine the historical data change rate based on the size of the historical backup data and the time for backing up the historical backup data.

Computing device 210 can generate a model of the data change rate based on the historical data change rate, or based on the size of the historical backup data and the time for backing up the historical backup data. For example, the approaches to generate the model include but are not limited to least squares polynomial fitting, one-dimensional linear regression, multiple linear regression, nonlinear methods, trend extrapolation, decomposition analysis methods, exponential smoothing, state space models, Markov prediction methods, data mining, neural networks, etc. Thus, computing device 210 can predict the data change rate based on the model of the data change rate.

At 420, computing device 210 acquires a recovery capability of backup system 230 to recover backed-up data. For example, the recovery capability may include the recovery capability for storage or network of backup system 230.

The recovery capability can be acquired in various manners. In some embodiments, computing device 210 can acquire the recovery capability directly from backup system 230. Alternatively, in some embodiments, computing device 210 can acquire a recovery rate and target recovery time for recovering the backed-up data. As an example, the recovery rate may indicate the recovery capability per unit of time, such as the network bandwidth or available storage resources. In addition, the target recovery time may be a time that meets the recovery time objective, such as 1 hour or 12 hours. Computing device 210 can determine, based on the recovery rate and the recovery time objective, the data volume that can be recovered during the target recovery time as the recovery capability. Since the target recovery time is a time that meets the recovery time objective, the determined recovery capability also meets the recovery time objective. More specifically, the determined recovery capability may be the maximum recovery capability that meets the recovery time objective.

For example, the recovery capability can be determined by the following Equation (1):

$$s_{max}=A*T \quad (1),$$

where $s_{max}$ represents the recovery capability, A represents the recovery rate, and T represents the target recovery time.

At 430, computing device 210 determines, based on the data change rate and the recovery capability, a backup strategy for backing up the data to be backed up. In some embodiments, computing device 210 can determine, based on the data change rate and the recovery capability, a backup time to back up the data to be backed up, wherein the data volume of data to be backed up that occurs during the period from the completion of a previous backup to the backup time does not exceed the data volume corresponding to the recovery capability. Thus, computing device 210 can determine the backup strategy based on the backup time.

For example, the data volume of the data to be backed up that occurs during the period from the completion of the previous backup to that backup time can be determined by the following Equation (2):

$$F_{(t)}=\int_{t_0}^{t}f_{(t)}dt \quad (2),$$

where $F_{(t)}$ represents the data volume of the data to be backed up that occurs during the period from the completion of the previous backup to that backup time, $f_{(t)}$ represents the data change rate, $t_0$ represents the time when the previous backup was completed, and t represents that backup time.

Thus, the following Equation (3) can be obtained based on Equations (1) and (2) above:

$$\int_{t_0}^{t}f_{(t)}dt \leq A*T \quad (3),$$

where A represents the recovery rate, T represents the target recovery time, $f_{(t)}$ represents the data change rate, $t_0$ represents the time when the previous backup was completed, and t represents that backup time.

With the above Equation (3), backup time t can be obtained, wherein backup time t makes the data volume of the data to be backed up accumulated during the period from the completion of the previous backup to that backup time not exceed the data volume corresponding to the recovery capability. As described above, since the recovery capability meets the recovery time objective, in the case where the accumulated data volume of the data to be backed up does not exceed the data volume corresponding to the recovery capability and after the accumulated data volume of the data to be backed up is backed up, the time required to recover the accumulated data volume should also meet the recovery time objective.

In addition, in some embodiments, full backups can be combined with non-full backups in order to save storage space while meeting the recovery time objective. For example, incremental backups are performed between two full backups. In this case, the determined backup time is the time of the next full backup. Further, computing device 210 can determine the time of incremental backups between the time of completion of the previous backup and the time of the next full backup. Thus, computing device 210 can determine the backup strategy based on the time of full backups and the time of incremental backups.

To this end, in some embodiments, in order to determine the backup strategy, computing device 210 determines, based on the backup time, the time for incremental backups during the period from the completion of the previous backup to that backup time, and determines the backup strategy based on the time for the incremental backups.

Figure 5A:
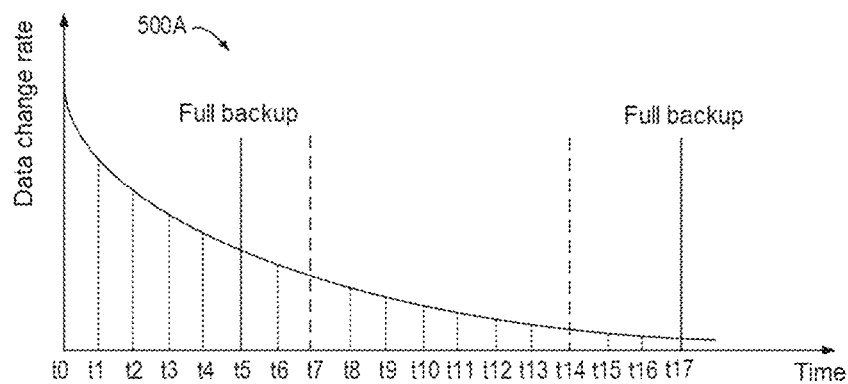
FIGS. 5A-5C illustrate dynamic backup strategies at different data change rates according to some embodiments of the present disclosure.
Figure 5B:
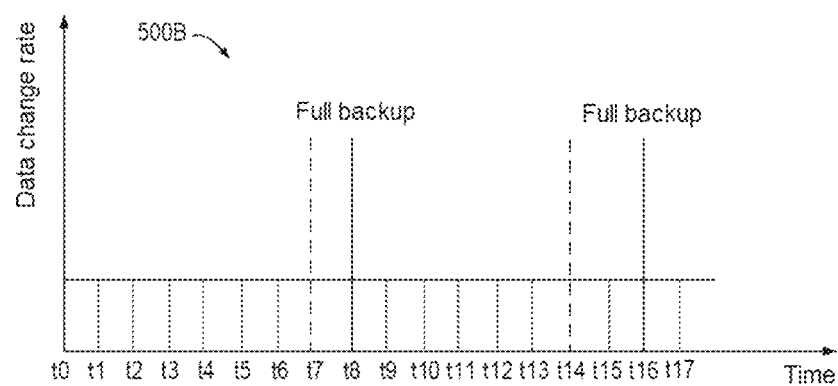
Figure 5C:
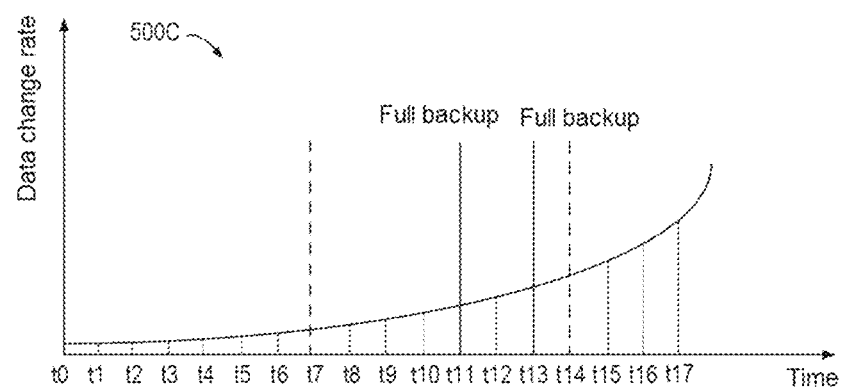

FIGS. 5A-5C illustrate dynamic backup strategies 500A-500C at different data change rates according to some embodiments of the present disclosure. Similar to FIGS. 1A-1C, in FIGS. 5A-5C, during time period t0-t17, the data change rate of data source 1 gradually decreases, the data change rate of data source 2 is relatively stable, and the data change rate of data source 3 gradually increases.

However, unlike the fixed backup strategies in FIGS. 1A-1C where full backups are performed at t0, t7, and t14 for all data sources, FIGS. 5A-5C illustrate dynamic backup strategies determined according to embodiments of the present disclosure. Such dynamic backup strategies are determined separately for the data sources. Further, even for the same data source, the intervals between two full backups may also be different because of the change in the data change rate.

Specifically, for data source 1, the second full backup can be advanced from t7 to t5 because of the high data change rates in earlier periods. In addition, the third full backup can be delayed from t7 to t17 because of the small data change rates in later periods.

For data source 3, since the data change rates in earlier periods are small, more incremental backups can be performed before the second full backup, so the second full backup can be delayed from t7 to t11. In addition, the third full backup should be performed not later than t13 due to the high data change rates in later periods.

For data source 2, the intervals between two full backups depend on its data change rate and the recovery time objective. If the recovery time objective is changed, the intervals between two full backups can be adjusted accordingly. In a case where the recovery time objective is met, attempts can be made to perform more incremental backups to reduce storage costs.

In this manner, by taking into account the data change rate of the data source and the recovery capability of the backup system, this solution can dynamically and intelligently predict, based on statistical methods, the time to perform full and/or non-full backups so as to determine the backup strategy. In addition, the backup strategy thus determined can also meet the recovery time objective requirements. In this manner, the backup efficiency of the backup system can be significantly improved, and the user experience can be improved.

Figure 6:
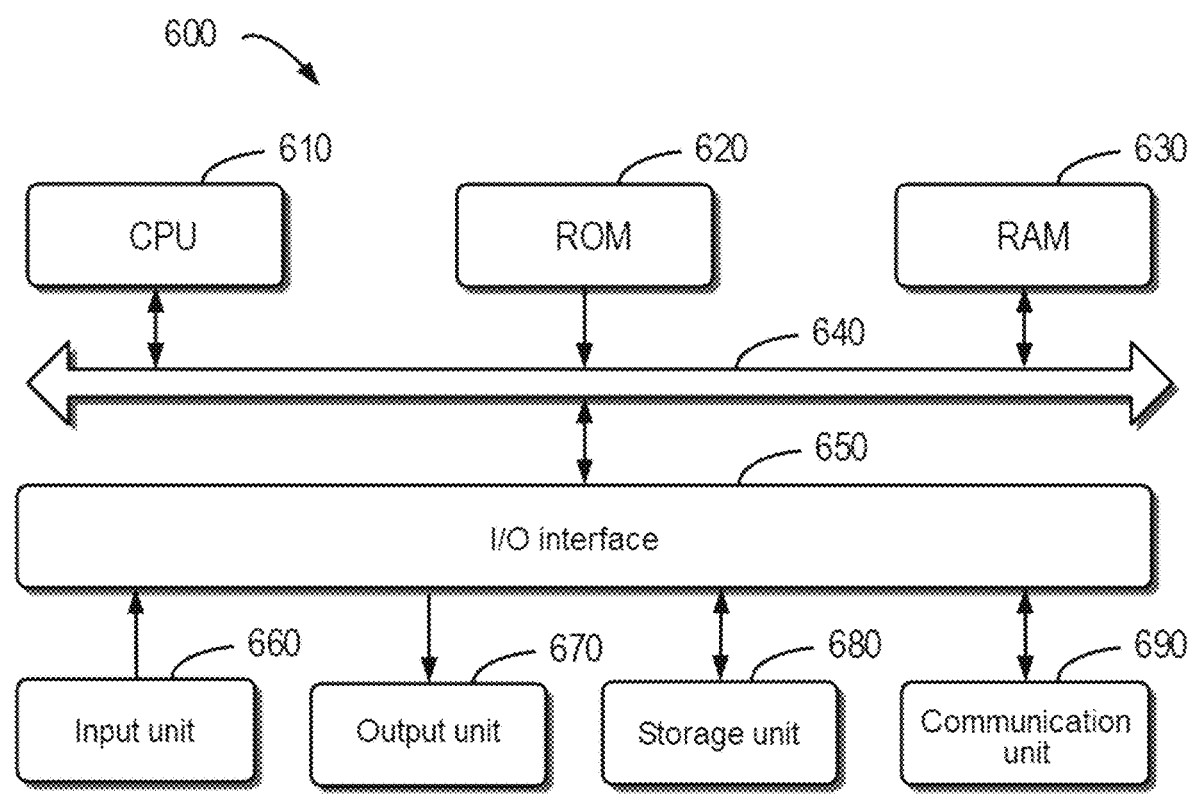
FIG. 6 illustrates a schematic block diagram of an example device in accordance with one or more embodiments of the present disclosure.

FIG. 6 illustrates a schematic block diagram of example device 600 that can be used to implement the embodiments of the present disclosure. For example, computing device 210 as shown in FIG. 2 may be implemented by device 600. As shown in the figure, device 600 includes central processing unit (CPU) 610 that may execute various appropriate actions and processing according to computer program instructions stored in read-only memory (ROM) 620 or computer program instructions loaded from storage unit 680 into random access memory (RAM) 630. In RAM 630, various programs and data required for operations of device 600 may also be stored. CPU 610, ROM 620, and RAM 630 are connected to each other through bus 640. Input/output (I/O) interface 650 is also connected to bus 640.

Multiple components in device 600 are connected to I/O interface 650, including: input unit 660, such as a keyboard and a mouse; output unit 670, such as various types of displays and speakers; storage unit 680, such as a magnetic disk and an optical disk; and communication unit 690, such as a network card, a modem, and a wireless communication transceiver. Communication unit 690 allows device 600 to exchange information/data with other devices over a computer network such as an Internet and/or various telecommunication networks.

The various processes and processing described above, such as process 400, may be executed by processing unit 610. For example, in some embodiments, process 400 may be implemented as a computer software program that is tangibly included in a machine-readable medium, for example, storage unit 680. In some embodiments, part or all of the computer program may be loaded and/or installed to device 600 via ROM 620 and/or communication unit 690. When the computer program is loaded into RAM 630 and executed by CPU 610, one or more actions of process 400 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. An example of the computer-readable storage medium may include, but is not limited to: an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives the computer-readable program instructions from the network, and forwards the computer-readable program instructions for storage in a computer-readable storage medium in each computing/processing device.

The computer program instructions for executing the operations of the present disclosure may be an assembly instruction, an instruction set architecture (ISA) instruction, a machine instruction, a machine-related instruction, microcode, a firmware instruction, state setting data, or source code or object code written in any combination of one or more programming languages. The programming languages include object-oriented programming languages, such as Java, Smalltalk, and C++, and also include conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block in the flow charts and/or block diagrams as well as a combination of blocks in the flow charts and/or block diagrams may be implemented by using the computer-readable program instructions.

The computer-readable program instructions may be provided to a processing unit of a general-purpose computer, a special-purpose computer, or other programmable data processing apparatuses to produce a machine, such that the instructions, when executed by the processing unit of the computer or other programmable data processing apparatuses, generate an apparatus implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the accompanying drawings illustrate the architectures, functions, and operations of possible implementations of systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skills in the art without departing from the scope and spirit of various disclosed embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for storage management, including:
   acquiring a data change rate of a data source, the data change rate indicating an occurrence rate of data to be backed up in the data source, wherein acquiring the data change rate includes:
     acquiring a historical data change rate of the data source, the historical data change rate indicating an occurrence rate of historical backup data in the data source, and
     determining the data change rate based on the historical data change rate;
   acquiring a recovery capability of a backup system to recover backed-up data;
   determining, based on the data change rate and the recovery capability, a backup strategy for backing up the data to be backed up, wherein determining the backup strategy comprises:
     determining, based on the data change rate and the recovery capability, a backup time to back up the data to be backed up, wherein:
       a data volume of data to be backed up that occurs during a period from a completion of a previous backup to the backup time does not exceed the data volume corresponding to the recovery capability, and
       a length of the period from the completion of the previous backup to the backup time changes based on the data change rate and the recovery capability, and determining the backup strategy based on the backup time; and backing up the data according to the backup strategy.

2. The method according to claim 1, wherein acquiring the historical data change rate includes:
acquiring a size of the historical backup data and a time for backing up the historical backup data; and
determining the historical data change rate based on the size and the time.

3. The method according to claim 1, wherein acquiring the recovery capability includes:
acquiring a recovery rate and a target recovery time for recovering the backed-up data; and
determining, based on the recovery rate and the target recovery time, a data volume that can be recovered during the target recovery time as the recovery capability.

4. The method according to claim 1, wherein the previous backup is a full backup, and wherein determining the backup strategy includes:
determining, based on the backup time, a time for incremental backups during the period from the completion of the previous backup to the backup time; and
determining the backup strategy based on the time for the incremental backups.

5. An electronic device, including:
at least one processing unit; and
at least one memory coupled to the at least one processing unit and storing instructions for execution by the at least one processing unit, wherein the instructions, when executed by the at least one processing unit, cause the device to perform actions including:
acquiring a data change rate of a data source, the data change rate indicating an occurrence rate of data to be backed up in the data source, wherein acquiring the data change rate includes:
acquiring a historical data change rate of the data source, the historical data change rate indicating an occurrence rate of historical backup data in the data source, and
determining the data change rate based on the historical data change rate;
acquiring a recovery capability of a backup system to recover backed-up data;
determining, based on the data change rate and the recovery capability, a backup strategy for backing up the data to be backed up, wherein determining the backup strategy comprises:
determining, based on the data change rate and the recovery capability, a backup time to back up the data to be backed up, wherein:
a data volume of data to be backed up that occurs during a period from a completion of a previous backup to the backup time does not exceed the data volume corresponding to the recovery capability, and
a length of the period from the completion of the previous backup to the backup time changes based on the data change rate and the recovery capability, and
determining the backup strategy based on the backup time; and
backing up the data according to the backup strategy.

6. The device according to claim 5, wherein acquiring the historical data change rate includes:
acquiring a size of the historical backup data and a time for backing up the historical backup data; and
determining the historical data change rate based on the size and the time.

7. The device according to claim 5, wherein acquiring the recovery capability includes:
acquiring a recovery rate and a target recovery time for recovering the backed-up data; and
determining, based on the recovery rate and the target recovery time, a data volume that can be recovered during the target recovery time as the recovery capability.

8. The device according to claim 5, wherein the previous backup is a full backup, and wherein determining the backup strategy includes:
determining, based on the backup time, a time for incremental backups during the period from the completion of the previous backup to the backup time; and
determining the backup strategy based on the time for the incremental backups.

9. A non-transitory computer-readable medium comprising computer readable program code, which when executed by a computer processor, enables the computer processor to:
acquire a data change rate of a data source, the data change rate indicating an occurrence rate of data to be backed up in the data source, wherein acquiring the data change rate includes:
acquiring a historical data change rate of the data source, the historical data change rate indicating an occurrence rate of historical backup data in the data source, and
determining the data change rate based on the historical data change rate;
acquire a recovery capability of a backup system to recover backed-up data;
determine, based on the data change rate and the recovery capability, a backup strategy for backing up the data to be backed up, wherein determining the backup strategy comprises:
determining, based on the data change rate and the recovery capability, a backup time to back up the data to be backed up, wherein:
a data volume of data to be backed up that occurs during a period from a completion of a previous backup to the backup time does not exceed the data volume corresponding to the recovery capability, and
a length of the period from the completion of the previous backup to the backup time changes based on the data change rate and the recovery capability, and
determining the backup strategy based on the backup time; and
back up the data according to the backup strategy.

10. The non-transitory computer-readable medium of claim 9, wherein acquiring the historical data change rate includes:
acquiring a size of the historical backup data and a time for backing up the historical backup data; and
determining the historical data change rate based on the size and the time.

11. The non-transitory computer-readable medium of claim 9, wherein acquiring the recovery capability includes:
acquiring a recovery rate and a target recovery time for recovering the backed-up data; and
determining, based on the recovery rate and the target recovery time, data volume that can be recovered during the target recovery time as the recovery capability.

12. The non-transitory computer-readable medium of claim 9, wherein the previous backup is a full backup, and wherein determining the backup strategy includes:
    determining, based on the backup time, a time for incremental backups during the period from the completion of the previous backup to the backup time; and
    determining the backup strategy based on the time for the incremental backups.

\* \* \* \* \*